Oct. 28, 1924.

C. L. BATCHELOR

AUTOMOBILE BUMPER

Filed May 21, 1924

1,513,149

Inventor:
Charles L. Batchelor,
by his Attorney,
Horace Barnes

Patented Oct. 28, 1924.

1,513,149

UNITED STATES PATENT OFFICE.

CHARLES L. BATCHELOR, OF PORTLAND, OREGON.

AUTOMOBILE BUMPER.

Application filed May 21, 1924. Serial No. 714,790.

*To all whom it may concern:*

Be it known that I, CHARLES L. BATCHELOR, a citizen of the United States, residing at Portland, in the county of Multnomah and State of Oregon, have invented certain new and useful Improvements in Automobile Bumpers, of which the following is a specification.

This invention relates to improvements in automobile bumpers; and particularly to that type described and claimed in my prior United States Patent No. 1,414,930, May 2, 1922.

It is the province of the present invention to improve generally that class of devices intended to safeguard vehicles from collision.

It is the further object of the invention to provide an automobile bumper of simple and economical construction which will fully protect the vehicle from injurious collision and which combines the maximum of resilience and shock absorption with effective stability, resistance against distortion, and reduction of weight; and which is adapted for application upon all types of automobiles and trucks.

The invention consists in the novel construction, arrangement and combination of an automobile bumper and its adaptation and securement to the front and rear portions of a vehicle in the most rigid and efficient manner, as will be fully described in the following specifications, illustrated in the accompanying drawings, and finally set forth in the appended claims.

Figure 1:
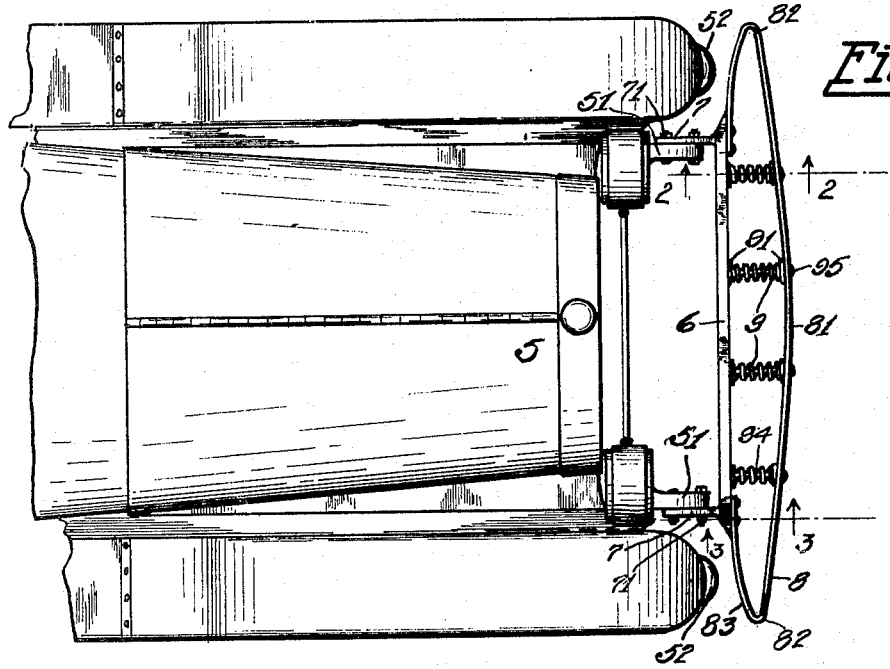
Figure 1 is a plan view of the front end of an automobile having a bumper embodying my invention attached thereto.
Figure 2:
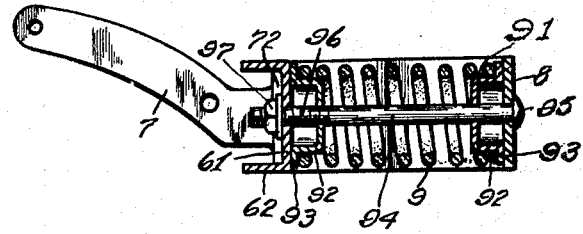
Fig. 2 is an enlarged view in cross-section on line 2—2 of Fig. 1.
Figure 3:
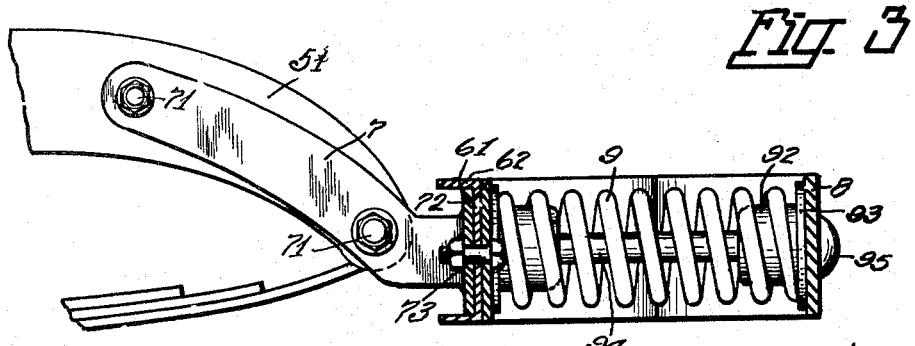
Fig. 3 is an enlarged view in cross section on line 3—3 of Fig. 1.

Referring to said views, in which similar characters of reference indicate like parts in the several views, the reference numerals 51 indicate the parallel, longitudinal frame-members of an automobile 5 to which my improved bumper is shown rigidly attached, although it may obviously be connected to any suitable portion of the car. Numeral 6 indicates a substantially straight metal beam, preferably of channel configuration in cross-section, having a web-portion 61 and side flanges 62. Said beam is rigidly connected adjacent its ends to relatively stable portions of the automobile frame, such as said members 51, as by brackets 7. Said brackets are preferably of the rigid type and are secured to said frame by bolts 71 and are each formed at their outer ends with a right-angled part 72 fitting closely against the side flanges 62 within the channel beam 6 and are rigidly secured therein by bolts 73.

A spring metal bar 8 is formed with a normally straight middle portion 81 having return bent extremities 82 extending inwardly and secured by bolts 73 or otherwise to the ends of the beam 6. The folded portions 83 of the bar extend laterally beyond the tires 52 of the car and are desirably of somewhat open rounded conformation.

A plurality of spaced coil-springs 9 are interposed symmetrically between the beam 6 and the bar-portions 81 and are desirably positioned therebetween under some tension due to the distension of the middle portion 81 and the compression of the springs with their outward thrust in turn causes an outward curvature of the bar and placing it under considerable tension. Said springs are formed of relatively open coils and are efficiently retained at each end by thimbles 91 having cup-like portions 92 pressed within the spring coils at their ends and are provided with circular flanges 93 interposed between the spring-ends, the bar-part 81 and beam 6, respectively.

Each said thimble is centrally apertured to receive a tension rod 94 which passes through the axis of each spring and through the beam 6 and bar-part 81. A head 95 on each said rod bears upon the outer side of said bar and its opposite end is screw-threaded, as at 96, to receive a nut 97 on the inner side of beam-web 61 whereby more or less inward pressure may be exerted upon the bar and consequently more or less tension placed thereon and upon the springs 9.

With the bumper organized and assembled substantially as described, it forms a homogeneous and unitary structure, interdependent and coordinated in all its parts to a high degree. It functions with a cantilever effect in the distribution of shocks encountered and in the instantaneous power of absorbing them throughout its structure, which is largely due to the particular method employed to maintain a state of tension throughout the operative parts of the bumper and in which the component parts of the bumper each bear a part. Thus a blow received upon either end of the bar 8 in proximity to the extremities or curved portions 83 will be largely and harmlessly taken up throughout its own arched configuration without damage but a considerable portion of the shock will be communicated through the bar-part 81 to the opposite extremity of the bumper which will tend to react outwardly under restraint of the rods 94. Said effect is in part due to the said arched configuration of the bar and the rounded end-connection with the beam and the leverage thereon afforded by the rigid connection of the bar-ends 82 to the beam 6.

Direct blows received upon the middle portion of the bar part 81 are absorbed directly through the inherent resistance of the bar in its curved condition and the resistance of the coil-springs 9. The tension rods 94 are slidable inwardly through the beam 6 under impact and play an important part in the adjustable retention that they exert upon the bar 8 and the springs 9.

The provision of the thimbles 91 within the ends of the coil-springs 9 formed with their flanges 93 adapted to bear upon the bar and beam and centering the springs by the extension therethrough of the rod 94 serves to prevent the slightest displacement of the springs and to prevent all noise or rattling consequent thereto.

Having described my invention, what I claim, is:—

1. In an automobile bumper, the combination of a channel beam, brackets rigidly connecting said beam within its channel at each end to the frame of the automobile, a spring-metal bar having recurved ends rigidly secured to said beam, a plurality of coil-springs interposed between said beam and said bar and distending said bar outwardly in arched conformation, and means to secure said springs in operative position.

2. An automobile bumper, consisting in combination, a metal beam having a channel therein directed rearwardly, brackets rigidly connecting said beam within its channel at each end to the frame of an automobile, a spring-metal bar having a normally straight middle portion and returned-curve ends fixedly secured to said beam, a plurality of coil-springs interposed between said beam and said bar distending the middle portion of the bar outwardly, and means to secure said springs in operative position and maintain them to prevent rattling.

3. An automobile bumper, consisting in the combination of a metal beam formed with a rearwardy directed channel, brackets rigidly connecting said beam within its channel at each end to the frame of an automobile, a spring-metal bar having a normally straight middle portion and return-curved ends fixedly secured to said beam, a plurality of coil-springs interposed between said beam and said bar, distending the middle portion of the bar outwardly, and rods adjustable as to effective length extending axially of said springs and through said bar and beam and adapted to yield rearwardly.

4. An automobile bumper, consisting in combination with a rigid beam and a forwardly positioned spring-bar having re-curved ends fixedly secured to said beam, of a plurality of coil-springs interposed between said beam and said bar, and means to maintain said coil-springs in position and against rattling consisting of metal thimbles having a cup-portion extending within the ends of the springs and a flange bearing upon the beam or bar, respectively, and rods having heads and nuts on their opposite ends and bearing upon the outside of said bar and beam, respectively, said rods extending axially of said springs and through apertures in said thimbles.

CHARLES L. BATCHELOR.